US012671605B2

(12) United States Patent
Shan et al.

(10) Patent No.: US 12,671,605 B2
(45) Date of Patent: Jun. 30, 2026

(54) CIRCUIT BOARD, CONTROLLER ASSEMBLY, CONTROLLER, CONTROL METHOD, AND VEHICLE

(71) Applicant: Yinwang Intelligent Technologies Co., Ltd., Shenzhen (CN)

(72) Inventors: Ning Shan, Shanghai (CN); Fuming Ren, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 133 days.

(21) Appl. No.: 18/486,900

(22) Filed: Oct. 13, 2023

(65) Prior Publication Data

US 2024/0039754 A1     Feb. 1, 2024

Related U.S. Application Data

(63) Continuation of application No. PCT/CN2021/087796, filed on Apr. 16, 2021.

(51) Int. Cl.
H04L 12/40          (2006.01)

(52) U.S. Cl.
CPC .................. H04L 12/40006 (2013.01); H04L 2012/40215 (2013.01); H04L 2012/40273 (2013.01)

(58) Field of Classification Search
CPC ..... H04L 12/40006; H04L 2012/40273; H04L 2012/40215
See application file for complete search history.

(56) References Cited

U.S. PATENT DOCUMENTS

| | | | |
|---|---|---|---|
| 2003/0128535 A1* | 7/2003 | Otani | H05K 9/0018 |
| | | | 361/816 |
| 2011/0176279 A1* | 7/2011 | Zhao | H01L 23/552 |
| | | | 361/720 |
| 2013/0016032 A1* | 1/2013 | Margulis | G06F 1/3203 |
| | | | 345/2.3 |
| 2016/0036519 A1* | 2/2016 | Loomis | G01S 19/41 |
| | | | 370/316 |
| 2017/0054204 A1* | 2/2017 | Changalvala | H01Q 1/42 |

(Continued)

FOREIGN PATENT DOCUMENTS

| | | |
|---|---|---|
| CN | 201903811 U | 7/2011 |
| CN | 102263569 A | 11/2011 |

(Continued)

OTHER PUBLICATIONS

International Search Report and Written Opinion in International Appln. No. PCT/CN2021/087796, mailed on Dec. 27, 2021, 17 pages (with English translation).

(Continued)

*Primary Examiner* — Henry Tsai
*Assistant Examiner* — Harry Z Wang
(74) *Attorney, Agent, or Firm* — Fish & Richardson P.C.

(57) ABSTRACT

This application describes examples of a circuit board, a controller, and a vehicle. In one example, the controller of the vehicle includes a first circuit board, a second circuit board, a radio frequency module, and a control chip. A first connector is disposed on the first circuit board, and a second connector is disposed on the second circuit board. The first circuit board is detachably mounted to the second circuit board through a connection between a first connector and a second connector.

16 Claims, 10 Drawing Sheets

300

(56)                    References Cited

U.S. PATENT DOCUMENTS

| | | | | |
|---|---|---|---|---|
| 2017/0077022 A1* | 3/2017 | Scanlan | .................. | H01L 24/19 |
| 2017/0173505 A1* | 6/2017 | Dhingra | ................ | F01M 11/10 |
| 2017/0229373 A1* | 8/2017 | Kim | ...................... | H10N 10/17 |
| 2019/0244903 A1* | 8/2019 | Azeroual | .............. | H05K 1/181 |
| 2020/0286804 A1* | 9/2020 | Fallin | ................... | H01L 23/345 |
| 2021/0022135 A1* | 1/2021 | Peng | .................... | H04W 72/12 |

FOREIGN PATENT DOCUMENTS

| | | |
|---|---|---|
| CN | 205750571 U | 11/2016 |
| CN | 111082824 A | 4/2020 |
| JP | 2013130656 A | 7/2013 |

OTHER PUBLICATIONS

Extended European Search Report in European Appln. No. 21936460. 1, mailed on Apr. 25, 2024, 7 pages.

* cited by examiner

CIRCUIT BOARD, CONTROLLER ASSEMBLY, CONTROLLER, CONTROL METHOD, AND VEHICLE

CROSS-REFERENCE TO RELATED APPLICATIONS

This application is a continuation of International Application No. PCT/CN2021/087796, filed on Apr. 16, 2021, the disclosure of which is hereby incorporated by reference in its entirety.

TECHNICAL FIELD

This application relates to a circuit board, a controller assembly, a controller, a control method, and a vehicle.

BACKGROUND

With the development of Internet of Vehicles technologies, more vehicles have a function to communicate with a base station. In such cases, an in-vehicle telematics box (T-Box) is generally disposed on the vehicle. The in-vehicle telematics box communicates with the base station, and each controller on the vehicle communicates with the in-vehicle telematics box through a gateway, so that each controller indirectly communicates with the base station.

However, disposition of a separate in-vehicle telematics box results in increased manufacturing costs and affects arrangement of other vehicle components because the in-vehicle telematics box occupies specific configuration space.

SUMMARY

This application provides a circuit board, a controller assembly, a controller, a control method, and a vehicle, to reduce manufacturing costs of the vehicle and facilitate in-vehicle communication apparatus miniaturization.

According to a first aspect of this application, a vehicle controller is provided, including: a first circuit board, where a first connector is disposed on the first circuit board; a radio frequency module, disposed on the first circuit board; a control chip, disposed on the first circuit board; and a second circuit board, where a second connector is disposed on the second circuit board. The first circuit board is detachably mounted to the second circuit board through a connection between the first connector and the second connector.

By using the foregoing controller, a radio frequency module configured to communicate with a base station is integrated into a control module of the controller. Therefore, a T-box does not need to be separately disposed to communicate with the base station, to reduce space and costs. For example, costs of manufacturing a T-box housing and the like are reduced, and wiring costs for connecting the T-box to an in-vehicle gateway and the like are reduced. In addition, the radio frequency module is mounted to the first circuit board with the control chip, so that a volume of the controller is not greatly increased because a communication function is integrated, thereby facilitating in-vehicle device miniaturization. To be specific, generally, the control module occupies small space in the controller, and there is sufficient space around the control module. Therefore, even if the radio frequency module is added on the first circuit board, an overall volume of the controller is not easy to greatly increase, and an external volume of the overall controller can almost remain unchanged. Therefore, the foregoing structure is used, and the volume of the controller is not greatly increased because the communication function is integrated, thereby facilitating in-vehicle device miniaturization.

In addition, the first circuit board is detachably mounted to the second circuit board through the connection between the first connector and the second connector, that is, the first circuit board is detachably mounted to the second circuit board. Therefore, when the control chip needs to be replaced due to maintenance or upgrade, only the control module (the first circuit board) needs to be removed from the second circuit board and the control module needs to be replaced, and the second circuit board does not need to be replaced. Therefore, not only costs can be reduced, but also steps such as re-plugging and unplugging a harness when replacing the second circuit board can be reduced, thereby shortening assembly time required for maintenance or upgrade.

In a possible implementation of the first aspect, the second connector includes a locking mechanism, configured to lock (fix) the first circuit board to the second connector. The foregoing structure is used, and because the first circuit board is locked to the connector by using the locking mechanism, the first circuit board can be prevented from being detached from a connector due to reasons such as vehicle body vibration.

In a possible implementation of the first aspect, the locking mechanism includes a screw.

In a possible implementation of the first aspect, an Ethernet cable connector configured to connect to a vehicle Ethernet bus is disposed on the second circuit board. In the foregoing manner, a radio frequency module related to a communication function and the control chip are integrated into a module (the control module), and are connected to the Ethernet bus as a whole through a cable connector. Compared with a case in which a communication module and the control module are separately disposed, this reduces wiring for connecting the communication module to the bus. Not only costs can be reduced, but also miniaturization can be facilitated.

In another possible implementation, the control module may be further connected to another type of bus.

In a possible implementation of the first aspect, the controller further includes a thermoelectric cooler, and the thermoelectric cooler is disposed on the first circuit board. In this way, the thermoelectric cooler can dissipate heat for the control chip, to ensure normal working of the control chip.

In a possible implementation of the first aspect, the controller further includes a shield, and the shield shields the control chip and the thermoelectric cooler.

In this way, air that may contact the thermoelectric cooler can be reduced, and a possibility of occurrence of problems such as a short circuit caused due to condensation generated on the thermoelectric cooler can be reduced.

In a possible implementation of the first aspect, the control chip and the thermoelectric cooler are sealed in space formed by the shield and the first circuit board.

In this way, the air that may contact the thermoelectric cooler can be reduced more effectively, and a possibility of occurrence of problems such as a short circuit caused by condensation generated on the thermoelectric cooler can be reduced.

In a possible implementation of the first aspect, a sealing ring is further included, and the sealing ring is disposed between the shield and the first circuit board. In this way, sealing can be implemented in a simple manner.

In a possible implementation of the first aspect, a glue filling portion filled in the space is further included.

In this way, for example, compared with a manner of implementing sealing by using a sealing ring, a problem that sealing performance is unreliable and that may be caused by aging of a rubber sealing ring can be avoided.

In a possible implementation of the first aspect, the shield is a metal part, the thermoelectric cooler has a hot end, and the hot end contacts an inner surface of the shield.

In this way, because the hot end of the thermoelectric cooler contacts the inner surface of the metal shield, heat of the hot end can be effectively dissipated outside the shield, thereby ensuring a heat dissipation effect for the control chip.

In a possible implementation of the first aspect, the controller is a vehicle cockpit domain controller, and the control chip is further configured to control an entertainment system and/or perform human machine interface interaction control.

According to a second aspect of this application, a circuit board is provided. A first connector, a radio frequency module, and a control chip are disposed on the circuit board.

The foregoing circuit board is used, and a radio frequency module configured to communicate with a base station is integrated into the circuit board. Therefore, a T-box does not need to be separately disposed to communicate with the base station, thereby reducing costs of manufacturing a housing of the T-box and the like, and reducing wiring costs for connecting the T-box to an in-vehicle gateway and the like. In addition, the radio frequency module is mounted to the first circuit board with the control chip, so that a volume of a controller is not greatly increased because a communication function is integrated, thereby facilitating vehicle structure miniaturization.

In addition, because the first connector is disposed on the circuit board, the circuit board can be detachably mounted in the controller. When the control chip needs to be replaced due to maintenance or upgrade, only the circuit board needs to be removed, and only the circuit board with the control chip needs to be replaced, thereby saving costs.

In a possible implementation of the second aspect, a thermoelectric cooler is disposed on the circuit board.

The foregoing structure is used, and the thermoelectric cooler can dissipate heat well for the control chip, to ensure utilization of computing capabilities of the control chip, and be applicable to a chip with high computing capabilities and high power consumption.

In a possible implementation of the second aspect, the circuit board further includes a shield, and the shield shields the control chip and the thermoelectric cooler.

If the thermoelectric cooler is used, there is a risk of short circuit caused by condensation. However, in the foregoing manner, because the shield is used to shield the control chip and the thermoelectric cooler, air that may contact the thermoelectric cooler can be reduced, and condensation can be suppressed.

In a possible implementation of the second aspect, the control chip and the thermoelectric cooler are sealed in space formed by the shield and the first circuit board.

In the foregoing manner, the control chip and the thermoelectric cooler are sealed in the space formed by the shield and the first circuit board. Therefore, the air that may contact the thermoelectric cooler can be further reduced, and a condensation phenomenon can be suppressed.

In a possible implementation of the second aspect, a sealing ring is further included. The sealing ring is disposed between the shield and the first circuit board. In this way, sealing can be implemented in a simple structure.

In a possible implementation of the second aspect, a glue filling portion filled in the space is further included. Sealing is implemented in a manner of glue filling. For example, compared with a manner of disposing a sealing ring, sealing reliability reduction caused by reasons such as aging of the sealing ring can be avoided.

In a possible implementation of the second aspect, the shield is a metal part. The thermoelectric cooler has a hot end, and the hot end contacts an inner surface of the shield.

In the foregoing manner, heat of the hot end of the thermoelectric cooler can be effectively dissipated outside the shield, thereby ensuring a heat dissipation effect of the control chip.

In a possible implementation of the second aspect, the radio frequency module and the control chip are disposed on a surface of the circuit board. In another implementation, the radio frequency module and the control chip may be further disposed on different surfaces of the circuit board.

According to a third aspect of this application, a controller assembly is related, including a second circuit board, and a second connector is disposed on the second circuit board.

With the controller assembly, because the second connector is disposed on the second circuit board, when control chip requires an upgrade, a first circuit board with the control chip may be removed from the second connector, and only the control chip and the first circuit board need to be replaced, eliminating a need to replace the second circuit board. This reduces costs.

In a possible implementation of the third aspect, an antenna cable connector is disposed on the second circuit board.

In a possible implementation of the third aspect, an Ethernet cable connector is disposed on the second circuit board.

According to a fourth aspect of this application, a vehicle is provided, including the controller of any one of the foregoing structures.

According to a fifth aspect of this application, a control method for a vehicle controller is provided. The controller includes: a first circuit board, where a plug-in first connector is disposed on the first circuit board; a radio frequency module, mounted on the first circuit board, and configured to electrically connect to an antenna that receives and transmits a signal to a base station; a control chip, mounted on the first circuit board, where the radio frequency module is controlled by the control chip; a second circuit board, where a plug-in second connector is disposed on the second circuit board, and the first circuit board is detachably mounted to the second circuit board through connection between the first connector and the second connector; and a thermoelectric cooler, configured to dissipate heat for the control chip. The control method includes: obtaining a temperature of the control chip; and when the temperature is lower than a first threshold, enabling the thermoelectric cooler to stop working.

The control method is used, and because when the temperature of the chip is lower than the first threshold, the thermoelectric cooler stops working, a power consumption increase caused by the thermoelectric cooler can be suppressed.

In a possible implementation of the fifth aspect, the control method for the controller further includes: when the temperature exceeds a second threshold, enabling the thermoelectric cooler to work, to dissipate heat for the control chip, where the second threshold is higher than the first threshold.

In this way, compared with a control manner based on only one threshold (that is, a manner of enabling the thermoelectric cooler to work when the temperature exceeds the first threshold, and disabling the thermoelectric cooler to work when the temperature is lower than the first threshold), it can be avoided that the thermoelectric cooler frequently switches between a working state and a non-working state when the temperature of the chip reaches the first threshold, which reduces a service life of the thermoelectric cooler.

In a possible implementation of the fifth aspect, when the temperature of the control chip is lower than a third threshold, the thermoelectric cooler is enabled to work, to heat the control chip, where the third threshold is lower than the first threshold. As a specific control method, a voltage direction of the thermoelectric cooler is opposite to that in a heat dissipation state, so that a cold end and a hot end of the thermoelectric cooler can be exchanged, and in this way, the thermoelectric cooler can switch from a heat dissipation state to a heating state.

In the foregoing manner, when the temperature of the control chip is excessively low, the control chip is heated by using the thermoelectric cooler, so that stability of the controller can be improved.

In addition, this specification further provides the following technical solutions.

Technical solution A: A vehicle controller, including a first circuit board; a control chip, mounted on the first circuit board and electrically connected to the first circuit board; and a second circuit board, where the first circuit board is detachably mounted to the second circuit board.

In the technical solution A, the controller may further include a plug-in connector, where the connector is mounted on the second circuit board, and the first circuit board is detachably plugged into the connector. The connector may include a locking mechanism, configured to lock the first circuit board to the connector. The locking mechanism may include a screw. The controller may further include a thermoelectric cooler, configured to dissipate heat for the control chip. The controller may further include a shield, and the shield shields the control chip and the thermoelectric cooler. The control chip and the thermoelectric cooler may be sealed in space formed by the shield and the first circuit board. The shield may be a metal part, the thermoelectric cooler has a hot end, and the hot end may contact an inner surface of the shield. The controller may be a cockpit domain controller, and the control chip may be further configured to control an entertainment system and/or perform human machine interface interaction control.

Technical solution B: A control module of a vehicle controller, including a first circuit board; a control chip, mounted on the first circuit board and electrically connected to the first circuit board; a thermoelectric cooler, configured to dissipate heat for the control chip; a shield, where the shield shields the control chip and the thermoelectric cooler. In addition, it may be understood that, in the technical solution B, a plurality of technical features described above may be appropriately combined.

Technical solution C: A circuit board of a vehicle controller, where a control chip, a thermoelectric cooler, and a shield are disposed on the circuit board, and the shield shields the control chip and the thermoelectric cooler. In addition, it may be understood that, in the technical solution C, a plurality of technical features of the circuit board in the second aspect may be further appropriately combined.

These aspects and another aspect of this application will be clearer and easier to understand in descriptions of the following (a plurality of) embodiments.

BRIEF DESCRIPTION OF DRAWINGS

The following further describes features of this application and a relationship between the features with reference to the accompanying drawings. The accompanying drawings are all examples, and some features are not shown in actual proportions. In addition, in some accompanying drawings, common features that are not mandatory for this application in the field of this application may be omitted. Alternatively, additional features that are not mandatory for this application are not shown. A combination of the features shown in the accompanying drawings is not intended to limit this application. In addition, in this specification, a same reference numeral indicates same content. Specific accompanying drawings are described as follows.

DESCRIPTION OF EMBODIMENTS

Figure 3:
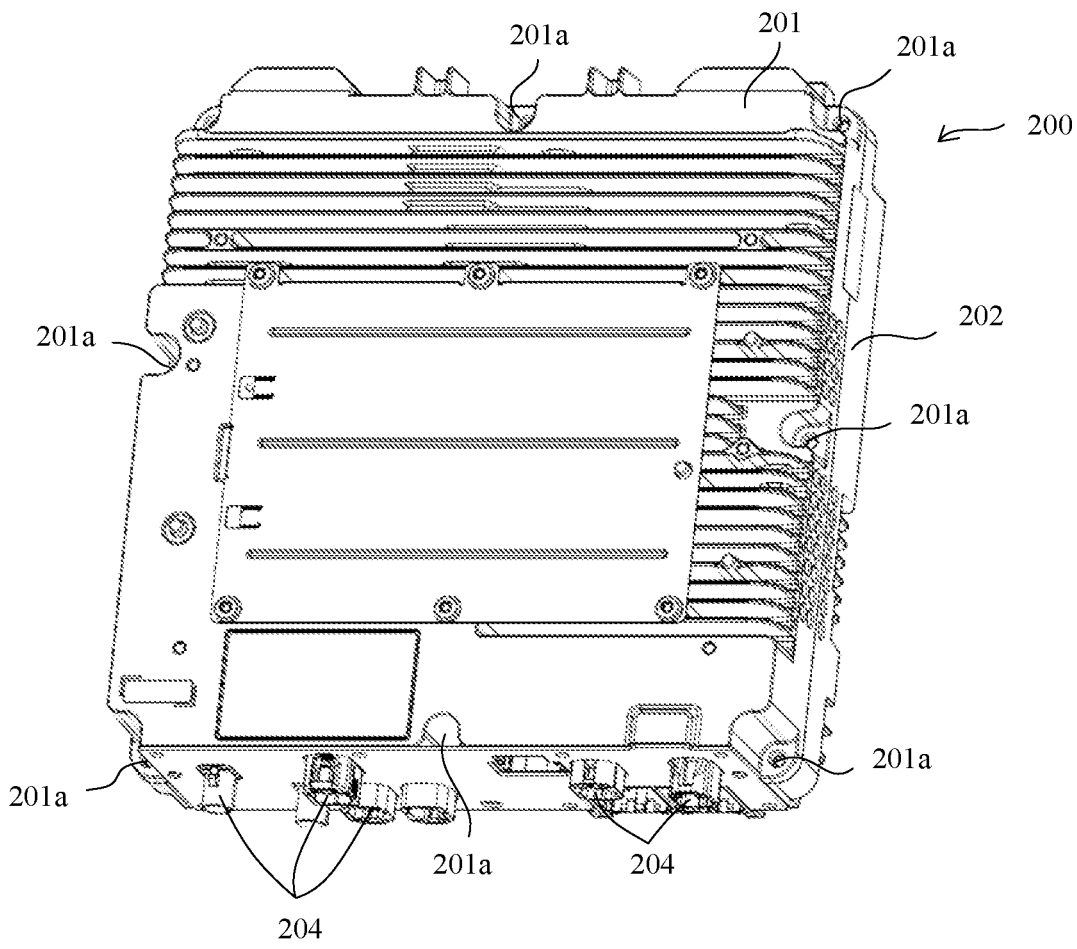
FIG. 3 is a schematic diagram of a three-dimensional structure of a cockpit domain controller according to an implementation of this application.

First, an in-vehicle network system in the conventional technology is described. As shown in FIG. 3, the in-vehicle network system 400 includes an in-vehicle telematics box (T-Box) 401, an in-vehicle gateway 402, a head unit controller or a cockpit domain controller (CDC) 403, and a vehicle controller or a vehicle control unit (VCU) 404. A communication module, for example, a 4G/5G module is disposed in the T-Box 401 to communicate with a base station outside a vehicle. The T-Box 401 communicates received packets with the in-vehicle gateway 402 through a high-speed Ethernet cable. The in-vehicle gateway 402 then communicates with the CDC 403 or the VCU 404 to complete data receiving and transmitting.

The in-vehicle network system 400 requires the T-Box 401 to be separately configured, which is both space and cost consuming. This makes it difficult to meet the requirement for miniaturization. Specifically, mounting a separate T-Box 401 on the vehicle requires additional space, which is already limited, and deployment of high-speed Ethernet cabling, resulting in time-consuming and costly vehicle assembly.

In contrast, an implementation of this application provides a cockpit domain controller, an in-vehicle network system, a vehicle, and the like, to reduce manufacturing costs.

Figure 1:
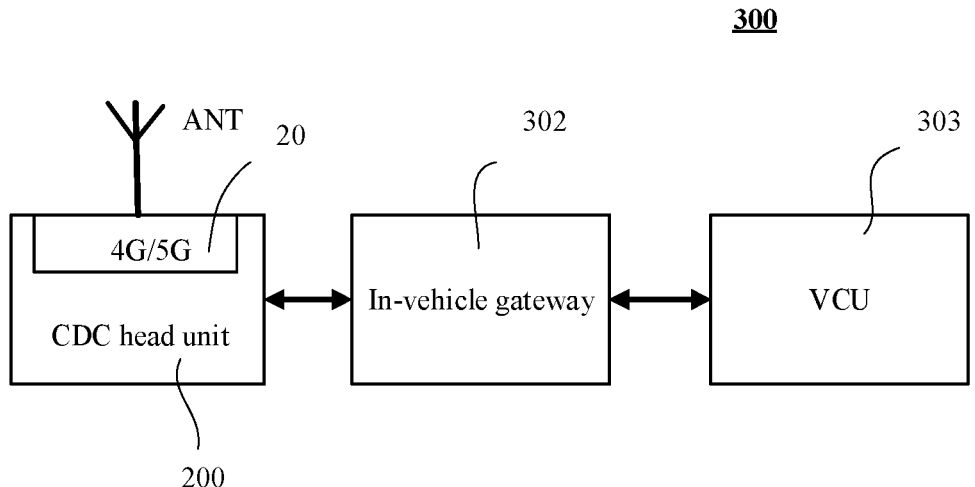
FIG. 1 is a schematic block diagram of an in-vehicle network system according to an implementation of this application.

FIG. 1 is a schematic block diagram of an in-vehicle network system 300 according to an implementation.

As shown in FIG. 1, the in-vehicle network system 300 includes a cockpit domain controller 200, an in-vehicle gateway 302, and a vehicle control unit 303. A wireless communication module 20 is disposed in the cockpit domain controller 200 to communicate with a base station outside a vehicle. In addition, the cockpit domain controller 200 is connected to the in-vehicle gateway 302 through, for example, a bus, and the in-vehicle gateway 302 is connected to the vehicle control unit 303 through, for example, a bus.

Figure 2:
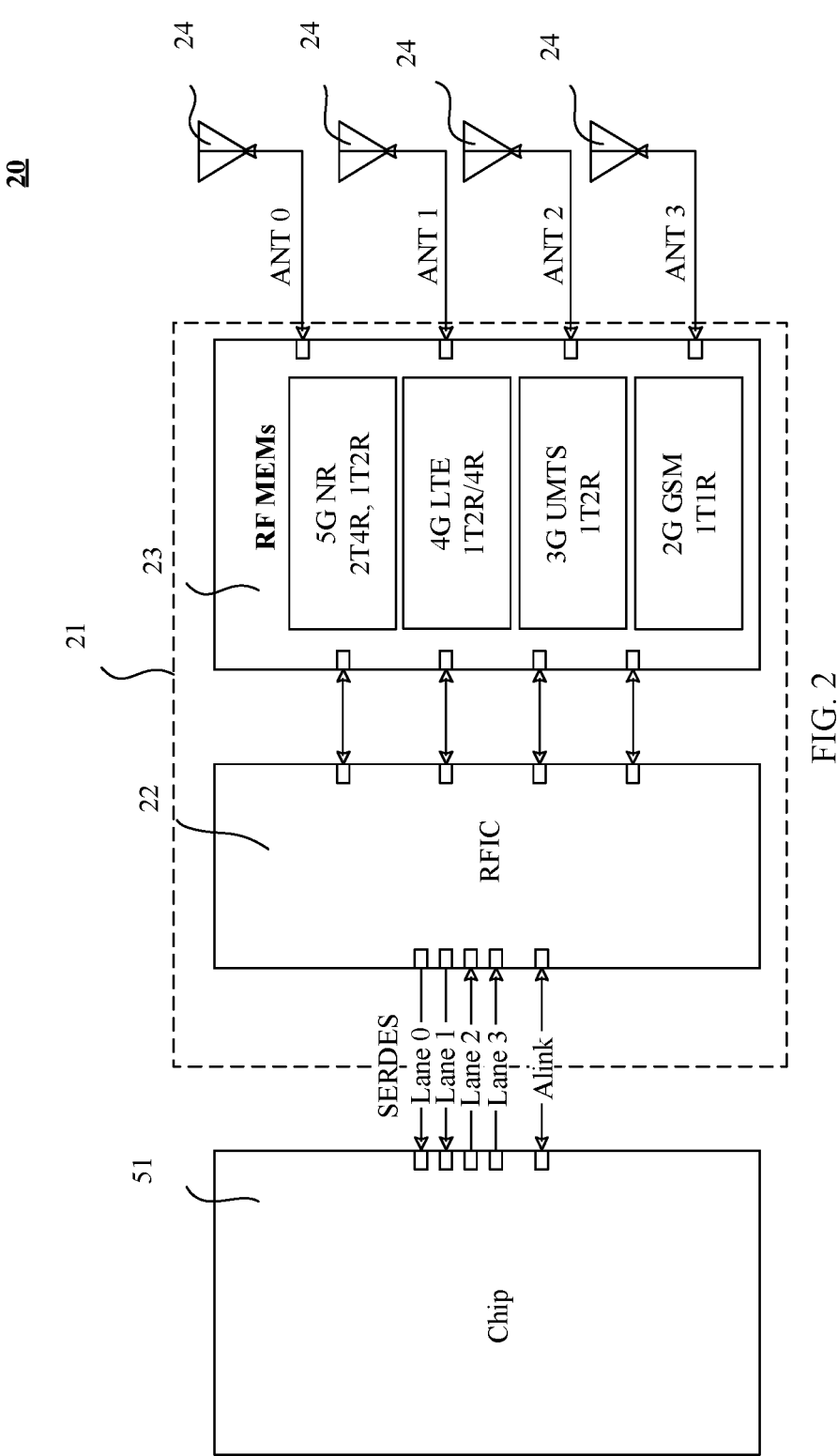
FIG. 2 is a schematic block diagram of a structure of a wireless communication module according to an implementation of this application.

FIG. 2 is a schematic block diagram of a structure of a wireless communication module according to an implementation.

As shown in FIG. 2, the wireless communication module 20 includes a control chip 51, a radio frequency module 21, and a plurality of antennas 24. The radio frequency module 21 includes a radio frequency integrated circuit (RFIC) 22 and a radio frequency micro-electro-mechanical system (RF MEMs) 23. The control chip 51 may be, for example, a Kirin 990 5G chip, configured to control the communication module 21. The radio frequency integrated circuit 22 is electrically connected to the control chip 51, and is further electrically connected to the RF MEMs 23. There are four antennas 24 in this implementation, which are 2G, 3G, 4G, and 5G antennas respectively, and are configured to receive and transmit signals with a base station.

The cockpit domain controller 200 and the in-vehicle network system 300 that have the foregoing structures are used. A T-box does not need to be separately disposed in the structures because the wireless communication module 20 is integrated into the cockpit domain controller 200 to implement communication with a base station outside the vehicle. Therefore, a structure can be compact, and in addition, a high-speed Ethernet cable does not need to be deployed to connect the T-box and an in-vehicle gateway, thereby reducing manufacturing costs.

The foregoing uses an example in which the wireless communication module 20 is integrated into the cockpit domain controller 200. However, in another implementation, the wireless communication module 20 may be integrated into another controller, for example, an autonomous driving controller, like a mobile data center (MDC) or a vehicle domain controller (VDC).

The following describes in detail an implementation structure of a cockpit domain controller with reference to FIG. 3 to FIG. 12.

Figure 4:
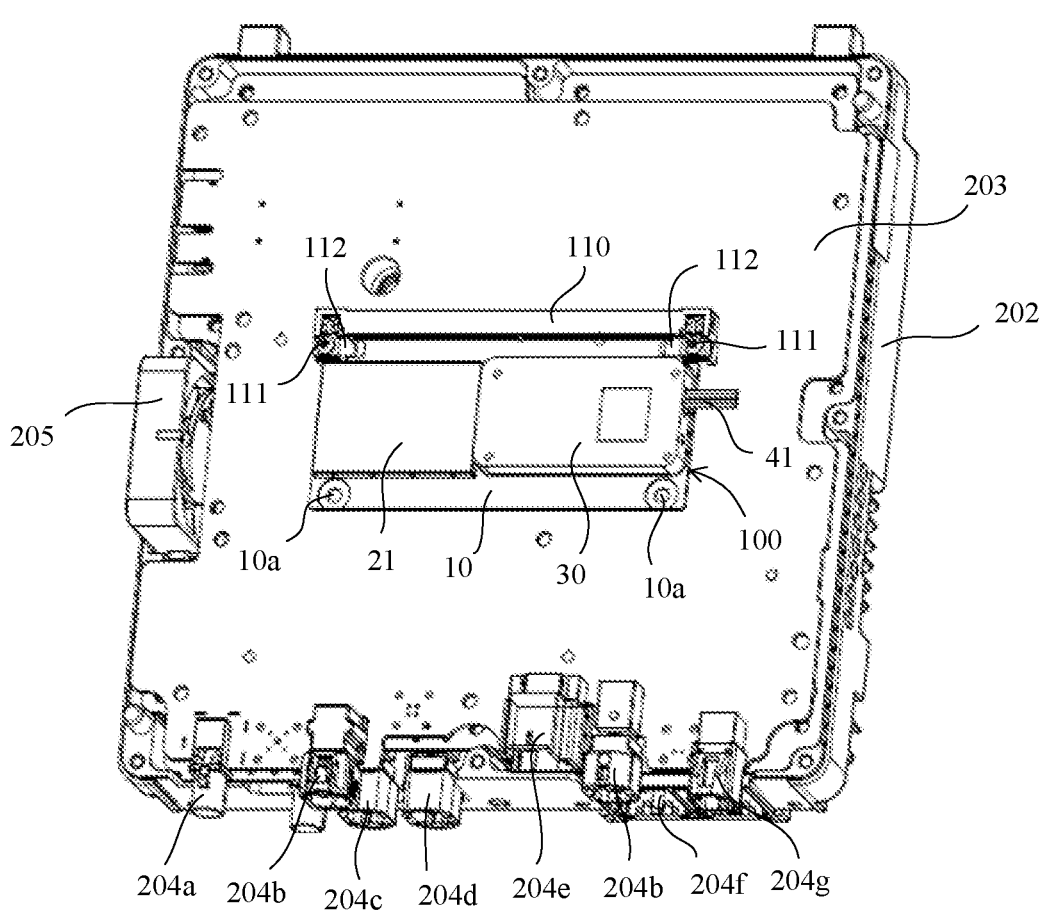
FIG. 4 is a schematic diagram of a three-dimensional structure in a state in which a first housing is removed from the structure shown in FIG. 3.
Figure 5:
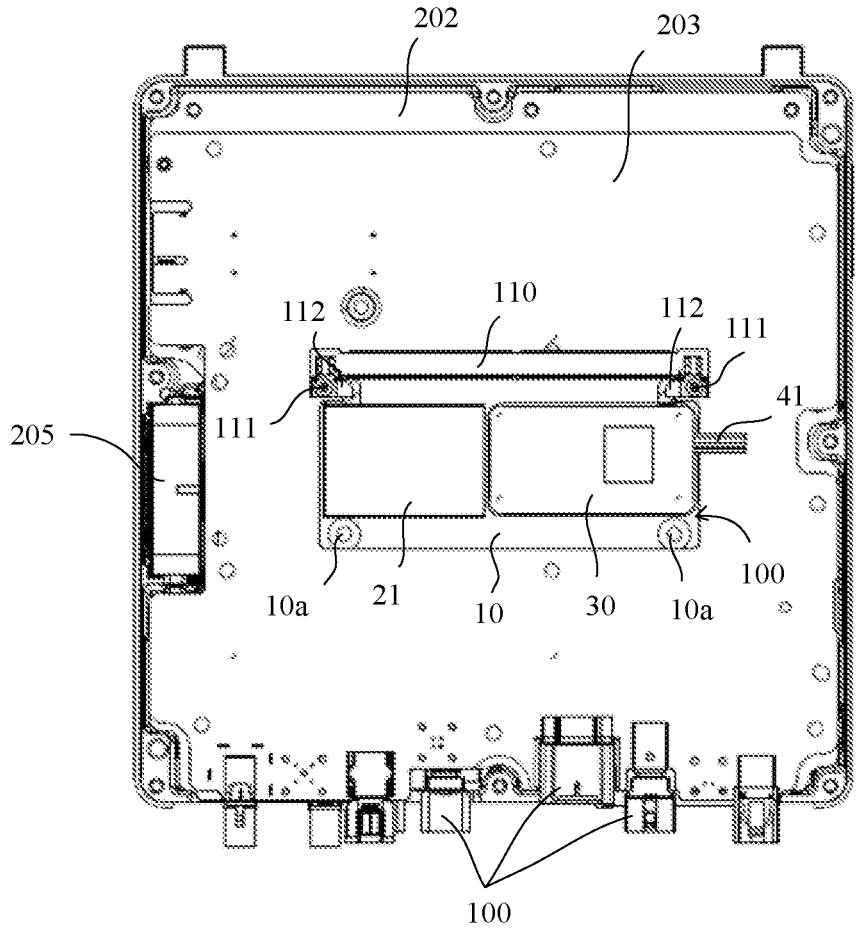
FIG. 5 is a schematic planar diagram of the structure in FIG. 4.
Figure 6:
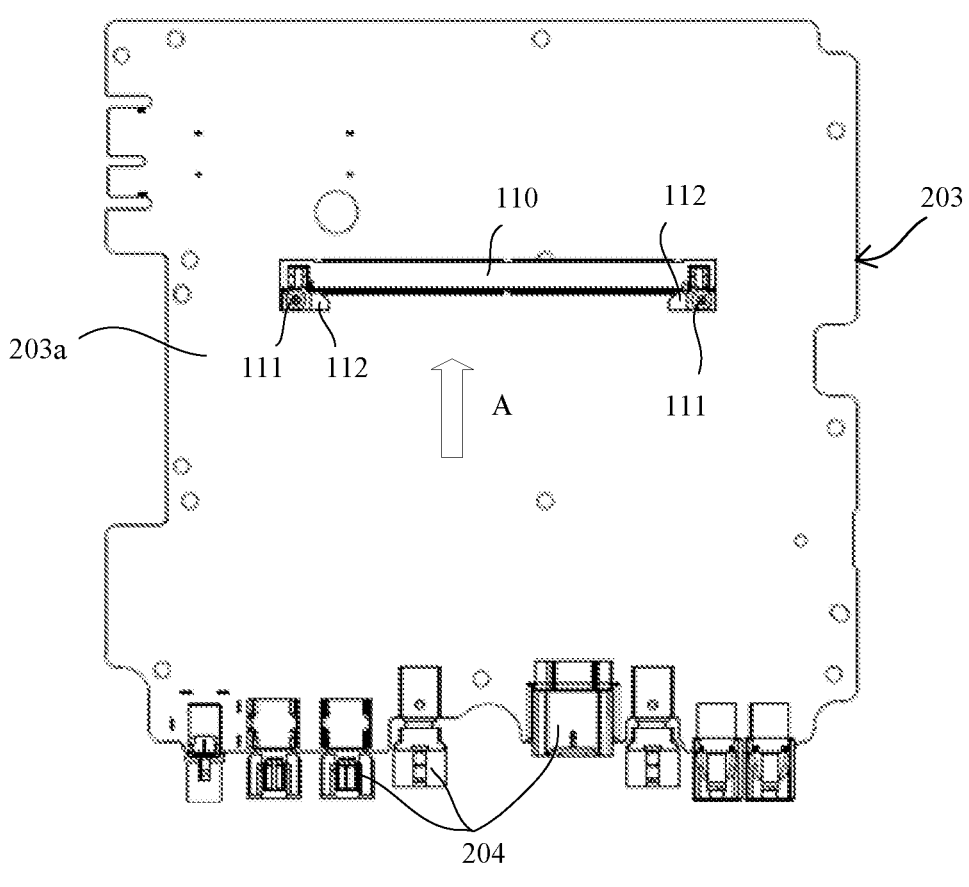
FIG. 6 is a schematic diagram of a structure of a circuit board according to an implementation of this application.
Figure 7:
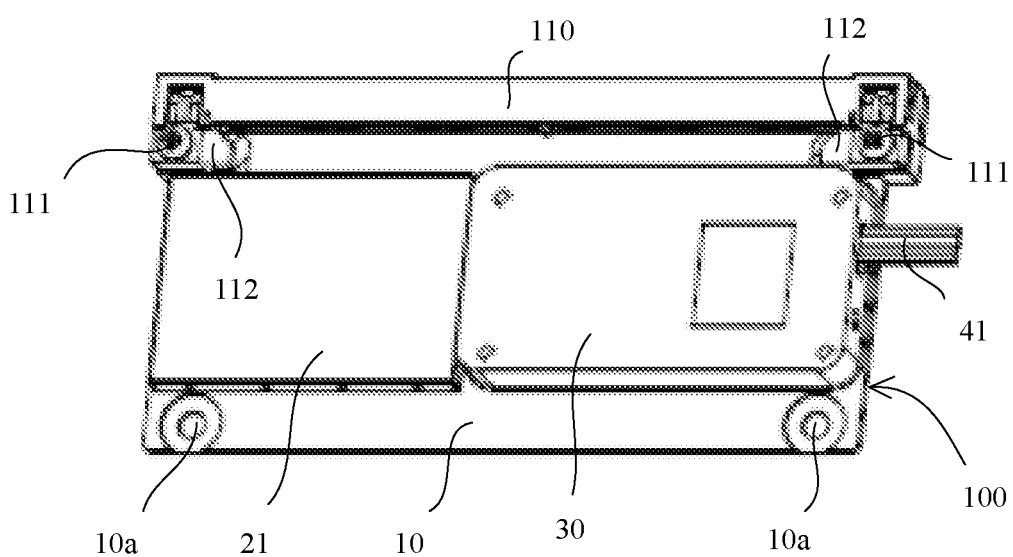
FIG. 7 is a schematic diagram of a structure of a control module and a connector according to an implementation of this application.
Figure 8:
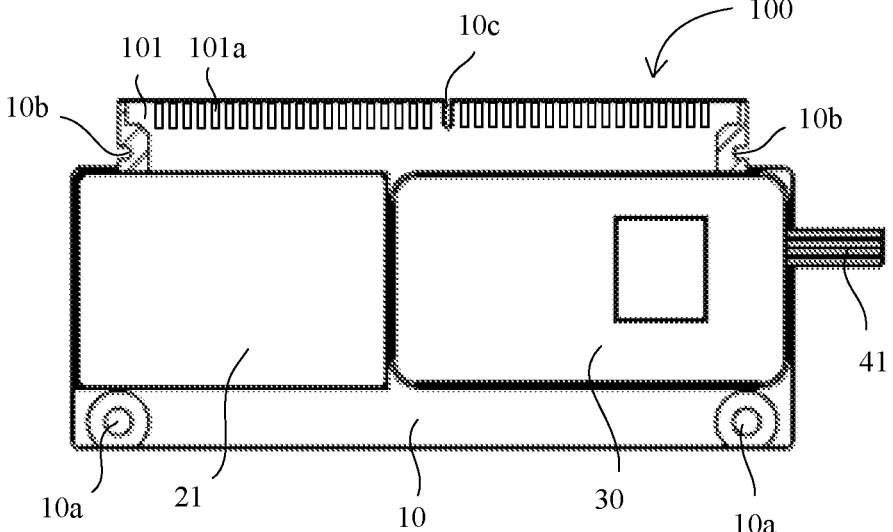
FIG. 8 is a schematic diagram of a plane structure of a control module according to an implementation of this application.
Figure 9:
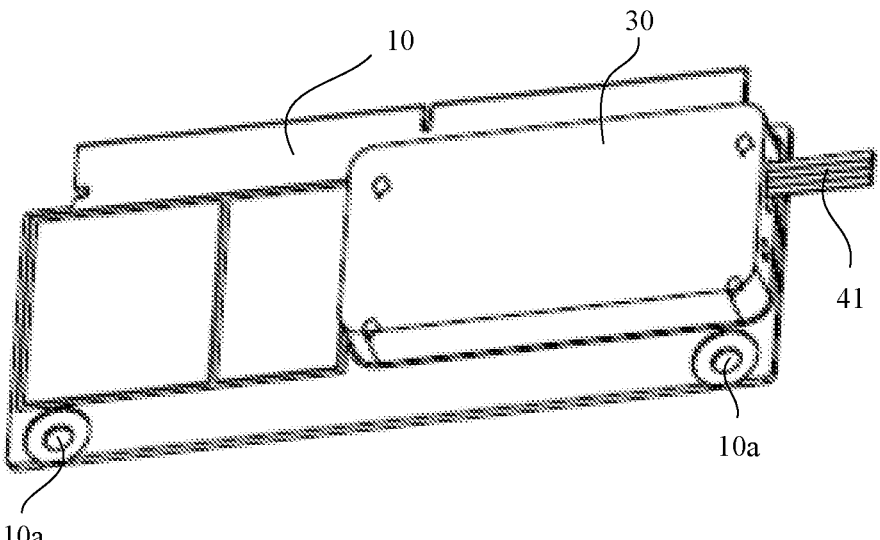
FIG. 9 is a schematic diagram of a three-dimensional structure of a control module according to an implementation of this application.
Figure 10:
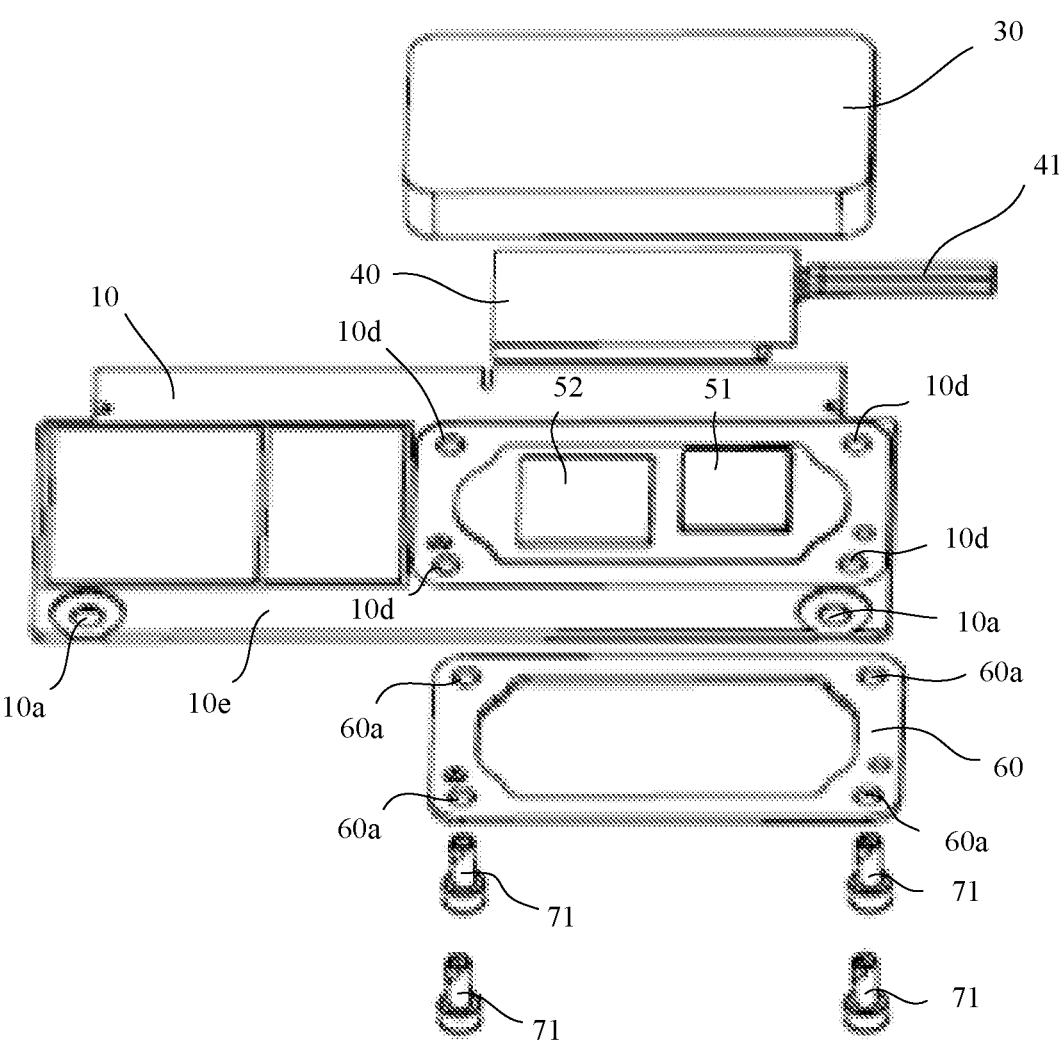
FIG. 10 is a schematic diagram of a breakdown structure of a control module according to an implementation of this application.
Figure 11:
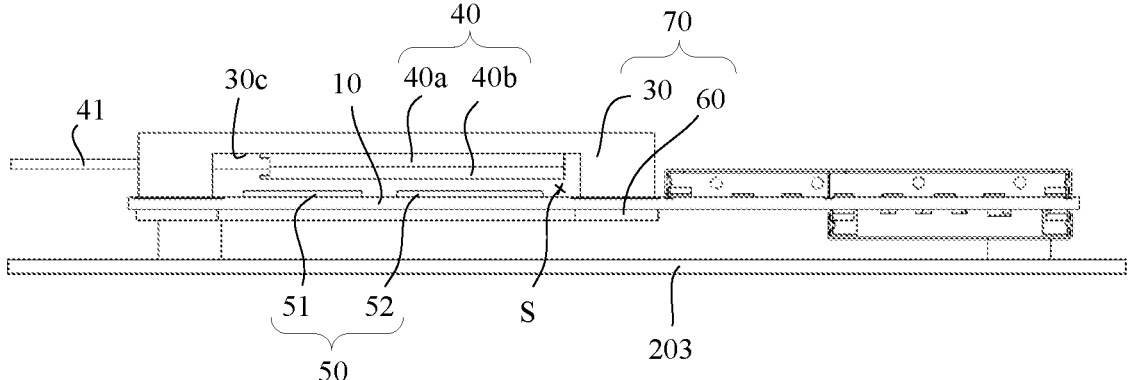
FIG. 11 is a schematic diagram of a structure of a control module and a circuit board according to an implementation of this application.
Figure 12:
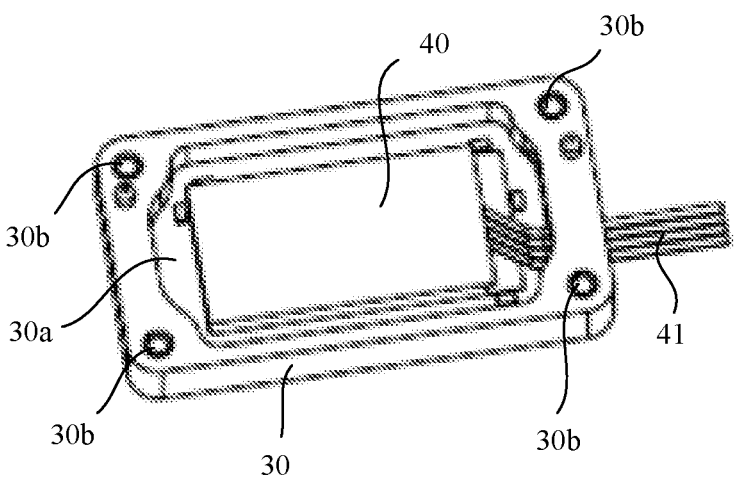
FIG. 12 is a schematic diagram of a structure of a shield and a thermoelectric cooler according to an implementation of this application.
Figure 13:
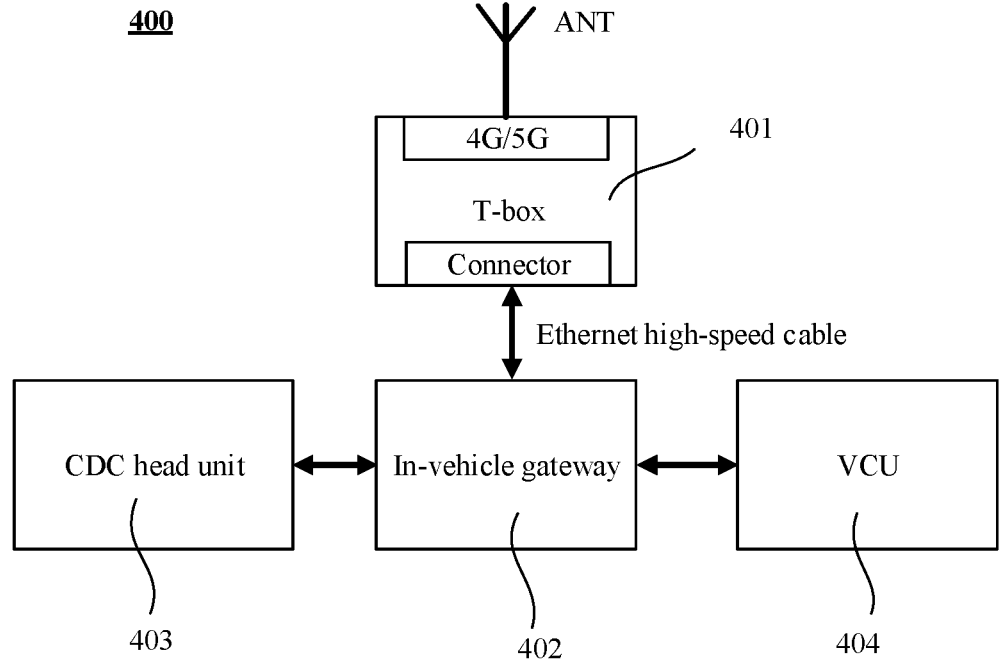
FIG. 13 is a schematic illustration diagram of an in-vehicle network system in the conventional technology.

FIG. 3 is a schematic diagram of a three-dimensional structure of a cockpit domain controller according to an implementation. FIG. 4 is a schematic diagram of a three-dimensional structure of the cockpit domain controller in a state in which a first housing is removed from FIG. 3. FIG. 5 is a schematic planar diagram of the structure in FIG. 4. FIG. 6 is a schematic diagram of a structure of a circuit board according to an implementation. FIG. 7 is a schematic diagram of a structure of a control module and a connector according to an implementation. FIG. 8 is a schematic diagram of a plane structure of a control module according to an implementation. FIG. 9 is a schematic diagram of a three-dimensional structure of a control module according to an implementation. FIG. 10 is a schematic diagram of a breakdown structure of a control module according to an implementation. FIG. 11 is a schematic diagram of a structure of a control module and a circuit board according to an implementation. FIG. 12 is a schematic diagram of a structure of a shield and a thermoelectric cooler according to an implementation.

As shown in FIG. 1 to FIG. 3, the cockpit domain controller 200 includes a first housing 201, a second housing 202, a circuit board 203, a fan 205, and a control module 100. The first housing 201 and the second housing 202 are half housings, and the first housing 201 and the second housing 202 are opposite to each other and are fixed together through a screw to form a complete housing. The figures show a plurality of screw holes 201a (eight screw holes in this implementation) disposed on the first housing 201. The circuit board 203, the fan 205, and the control module 100 are accommodated inside the housing formed by the first housing 201 and the second housing 202. The first housing 201, the second housing 202, the circuit board 203, and the fan 205 herein form a controller assembly in this application.

The control module 100 has a control chip 51 (FIG. 11), and is an execution body of a plurality of control functions (for example, controlling a display of a vehicle to display a navigation picture) of the cockpit domain controller 200.

A plug-in connector (female connector) 110 is disposed on the circuit board 203, and the control module 100 is detachably mounted to the circuit board 203 through the connector 110, and is electrically connected to a circuit on the circuit board 203. The fan 205 is mounted on a side of the circuit board 203, and is configured to dissipate heat for the circuit board 203 and the control module 100. In addition, a plurality of cable connectors 204 are disposed on the circuit board 203, and the cable connectors 204 extend out of the first housing 201 and the second housing 202, and are configured to connect various cables. As shown in FIG. 4, the cable connectors 204 include: an antenna cable connector 204a for connecting an antenna 24 that communicates with a base station, two camera cable connectors 204b for connecting a camera, an instrument panel cable connector 204c for connecting an instrument panel, a central control screen cable connector 204d for connecting a central control screen, and a USB cable connector 204e serving as a universal serial bus (USB) port for connecting to, for example, an external memory, a controller area network (CAN) bus cable connector 204f configured to connect the control module 10 to a bus of the vehicle, and an Ethernet cable connector 204g. The antenna 24 connected to the cable connector 204a is electrically connected to the radio frequency module 21 through the circuit board 203 and a circuit board 10.

The bus of the vehicle includes, for example, an Ethernet bus and a CAN bus. In this implementation, the CAN bus cable connector 204f is configured to electrically connect to the CAN bus, and the Ethernet cable connector 204g is configured to electrically connect to the Ethernet bus. Electrical connection includes power supply connection (strong electrical connection) and signal connection (weak electrical connection). In addition, the circuit board 203 corresponds to the second circuit board in this application.

The following describes a mounting structure of the control module 100 in detail.

As shown in FIG. 8, a plug-in connector 101 is disposed on the circuit board 10. In this implementation, the connector 101 is a gold finger connector that has a plurality of gold fingers 101a. In addition, as shown in FIG. 4 to FIG. 7, the plug-in connector (female connector) 110 is disposed on a surface 203a of the circuit board 203, and the connector 110 matches the connector 101. As shown by a hollow arrow A in FIG. 6, when the control module 100 is mounted on the circuit board 203, the control module 100 moves along a direction parallel to the surface 203a, so that the connector 101 is connected to the connector 110. In this way, when the control module 100 is mounted on the circuit board 203 through the connector 110, the circuit board 10 is electrically connected to the circuit board 203 through the connector 110. The connector 101 herein corresponds to the first connector in this application, and the connector 110 corresponds to the second connector in this application.

In addition, an actual design may be, for example, disposing more pins on the connector 110, so that a rated power of the connector 110 on the circuit board 203 can exceed that of the connector 101 on the circuit board 10. By doing so, a strong power supply capability is reserved for a control module 100 with higher power.

In addition, two screws 111 and two clamping plates 112 are disposed on the connector 110. After the control module 100 is plugged into the connector 110, the clamping plate 112 can press the circuit board 10 and be clamped with an opening 10b (FIG. 8) on the circuit board 10 by tightening the screw 111, so that the control module 100 is locked on the connector 110, and can avoid being detached from the connector 110 due to vibration or other reasons.

The screw 111 herein is an example of the locking mechanism in this application. In another implementation, the control module 100 may be prevented from being detached from the connector 110 through a buckle structure.

In addition, in this implementation, a pluggable connection manner is used as an example to describe a detachable connection. However, it may be understood that another detachable connection may also be used.

As shown in FIG. 4, FIG. 5, and FIG. 7 to FIG. 10, and the like, the control module 100 includes the circuit board 10, and two through holes 10a are disposed on the circuit board 10. Screws (not shown in the figures) are screwed into the two through holes 10a, and the screws are screwed into the circuit board 203, so that the control module 100 can be directly fixed to the circuit board 203. In addition, two openings 10b are further disposed on the circuit board 10, and opening directions (left and right directions in FIG. 8 respectively) of the two openings 10b are opposite. When the screw 111 is tightened, the two openings 10b are stuck, so that the control module 100 is locked on the connector 110, and can avoid being detached from the connector 110 in a direction opposite to a direction of the arrow A (a down direction in FIG. 8). In addition, an opening 10c is further disposed on the circuit board 10, an opening direction (an up direction in FIG. 8) of the opening 10c is perpendicular to the opening direction of the opening 10b, and the opening 10c is used to be clamped with the connector 110, so that the circuit board 10 can be easily aligned with a position of the connector 110 during mounting, to accurately connect a connection terminal on the circuit board 10 to a connection terminal on the connector 110. In addition, the opening 10c can further suppress position fluttering of the circuit board 10 in a left-right direction in FIG. 8 when the circuit board 10 is plugged into the connector 110. In addition, the circuit board 10 corresponds to the first circuit board in this application.

With the foregoing structure, the control module 100 is detachably mounted on the circuit board 203 in a plug-in manner. When hardware of the cockpit domain controller 200 requires an upgrade, the control module 100 may be removed from the circuit board 203, and only the control module 100 needs to be replaced, eliminating a need to replace the circuit board 203. This not only reduces costs but also avoids the complexities and extended labor associated with cabling the plurality of cable connectors 204 to replace a circuit board 203, especially when the control module is fixed on the circuit board 203 in a soldering manner.

The following describes a heat dissipation structure of the control module 100.

As shown in FIG. 8 to FIG. 12, in addition to the circuit board 10, the control module 100 further includes the radio frequency module 21, a chip 50, a thermoelectric cooler (TEC) 40, and a protection unit 70 formed by a shield 30 and a gasket 60.

The radio frequency module 21 is an integrated device of a radio frequency integrated circuit 22 and a radio frequency micro-electro-mechanical system 23. The radio frequency module 21 and the chip 50 are mounted side by side on a surface 10e of the circuit board 10, and are electrically connected to a circuit on the circuit board 10. In another implementation, the radio frequency module 21 and the chip 50 may alternatively be mounted on different surfaces of the circuit board 10. In addition, in this implementation, the chip 50 includes a control chip 51 and a memory chip 52. The control chip 51 is a main chip, and is configured to implement control (audio control, video control, or the like) of an in-vehicle infotainment system, human machine interface (HMI) interaction control, meter display control, and the like in addition to controlling the radio frequency module 21. The memory chip 52 is a memory chip, for example, a universal flash storage (UFS) or a double data rate (DDR) synchronous dynamic random access memory. In addition, a matching power source chip may be further disposed.

The thermoelectric cooler 40 is a device that performs cooling by using a Peltier effect, and is configured to dissipate heat for the chip 50. As shown in FIG. 11, the thermoelectric cooler 40 has a hot end 40a and a cold end 40b. The hot end 40a is configured to discharge heat, and the cold end 40b is configured to absorb heat. Therefore, the thermoelectric cooler 40 is configured as follows: The cold end 40b is close to the chip 50, and the hot end 40a is away from the chip 50. By disposing the thermoelectric cooler 40, heat can be well dissipated for the chip 50, and heat generated by high computing capabilities and high power consumption of the chip 50 can be handled. In addition, with reference to heat dissipation of the fan 205, a heat dissipation effect can be further improved.

However, a condensation phenomenon is easily generated when the thermoelectric cooler 40 is disposed. If condensation is generated, a short circuit may be caused. Therefore, in this implementation, the protection unit 70 is disposed to suppress condensation generated on the thermoelectric cooler 40 and the chip 50.

As shown in FIG. 10 to FIG. 12, the protection unit 70 includes the shield 30, the gasket 60, and a plurality of screws 71. The shield 30 is disposed on the surface 10e of the circuit board 10, to shield the chip 50 and the thermoelectric cooler 40. The gasket 60 is disposed on another surface side of the circuit board 10 opposite to the surface 10e, and is separated from the shield 30 by the circuit board 10. A plurality of through holes 60a (four in this implementation) are disposed on the gasket 60, a plurality of through holes 10d (four in this implementation) are disposed on the circuit board 10, and a plurality of screw holes 30*d* are disposed on the shield 30. Positions of the through holes 60*a*, the through holes 10*d*, and the screw holes 30*d* correspond to each other. The plurality of screws 71 are screwed into the screw holes 30*d* through the through holes 60*a* and the through holes 10*d* respectively, in this way, the shield 30 and the gasket 60 can be mounted on the circuit board 10.

The structure is used, and because the chip 50 and the thermoelectric cooler 40 are shielded by the shield 30, air that may contact the chip 50 and the thermoelectric cooler 40 can be reduced, thereby suppressing condensation generated on the thermoelectric cooler 40.

In addition, optionally, a sealing ring may be disposed between the shield 30 and the surface 10*e* of the circuit board 10. In this way, the air that may contact the thermoelectric cooler 40 can be further reduced, and condensation generated on the thermoelectric cooler 40 can be suppressed.

In addition, as shown in FIG. 10 to FIG. 12, a connection line 41 is disposed on the thermoelectric cooler 40, and the connection line 41 passes out of the shield 30 through a through hole (not shown in the figure) disposed on the shield 30. In this implementation, the connection line 41 is a power line, and is connected to a power source (not shown in the figure) disposed on the circuit board 203, so that the power source can supply power to the thermoelectric cooler 40. Optionally, after the shield 30 is mounted on the circuit board 10, glue is poured at the through hole through which the connection line 41 passes, to seal the through hole. In this way, the air that may contact the thermoelectric cooler 40 can be further suppressed, and condensation generated on the thermoelectric cooler 40 can be suppressed. In other words, referring to FIG. 11, the control chip 51 and the thermoelectric cooler 40 are sealed in space S formed by the shield 30 and the circuit board 10, so that the air that may contact the thermoelectric cooler 40 can be effectively suppressed, and condensation generated on the thermoelectric cooler 40 can be suppressed.

In addition, optionally, glue may be poured in the space S to form a glue filling portion. In this way, a short circuit problem caused by condensation generated on the thermoelectric cooler 40 can be more effectively suppressed.

In addition, in this implementation, the shield 30 is a metal part. Therefore, through a good heat dissipation feature of metal, heat of the thermoelectric cooler 40 can be easily dissipated to air outside the shield 30. In addition, in this implementation, as shown in FIG. 11, the hot end 40*a* of the thermoelectric cooler 40 contacts an inner surface of the shield 30. In this way, heat generated by the hot end 40*a* of the thermoelectric cooler 40 can be dissipated to the air outside the shield 30.

In another implementation, the shield 30 may also be a plastic part, and a window portion is disposed on the shield 30, so that the hot end 40*a* of the thermoelectric cooler 40 is exposed through the window portion, and heat generated by the hot end 40*a* is easily dissipated to an outside of the shield 30. In this case, a gap between the hot end 40*a* of the thermoelectric cooler 40 and the window portion of the shield 30 may be filled with sealant, to well suppress condensation generated on the thermoelectric cooler 40.

In addition, this implementation further provides a heating control method for heating the chip 50. Specifically, a temperature sensor is disposed within the chip 50. The control chip 51 continually monitors temperatures of the control chip 51 and the memory chip 52. When the temperature of the control chip 51 or the memory chip 52 exceeds a second threshold (for example, 75° C.), the control chip 51 enables the thermoelectric cooler 40 to be connected to a power source, allowing the thermoelectric cooler 40 to dissipate heat for the chip 50. When the temperature is lower than a first threshold (for example, 60° C.), the thermoelectric cooler 40 is disconnected from the power source and the thermoelectric cooler 40 is turned off, reducing the added power consumption associated with the thermoelectric cooler 40 for heat dissipation.

When the temperature of the control chip 51 or the memory chip 52 is lower than a third threshold (for example, a value below −40° C.), the thermoelectric cooler 40 is activated to heat the control chip 51 or the memory chip 52. In this way, it can be ensured that the control chip 51 or the memory chip 52 can work reliably within a rated working temperature range, enhancing stability of the controller 200.

As a specific control method, a power source of the thermoelectric cooler 40 is reversely connected, and a voltage direction is opposite to that in a state in which heat dissipation is performed, so that the cold end and the hot end of the thermoelectric cooler 40 can be exchanged (an end farther from the control chip 51 becomes a cold end, and an end nearer to the control chip 51 becomes a hot end). In this way, the thermoelectric cooler 40 can be switched from a heat dissipation state to a heating state.

In the foregoing implementation, the radio frequency module 21 and the control chip 51 are mounted on the circuit board 10 of the control module 100, and the control chip 51 bears a function of controlling the radio frequency module 21. Therefore, the communication module 20 is integrated into the control module 100, eliminating the need for an additional T-Box and reducing manufacturing costs. In addition, the radio frequency module 21 is mounted to the circuit board 10 with the control chip 51. In this way, the integration of the communication module does not result in an increased size of the cockpit domain controller 200. This integration aids in the miniaturization of the vehicle's structure.

In addition, this implementation further provides a vehicle including the foregoing cockpit domain controller 200 and the foregoing in-vehicle network system 300.

In addition, in the foregoing description, the radio frequency module 21 and the control chip 51 are mounted on a same circuit board 10. However, considering that the control module 100 is detachably mounted to the circuit board 203 to facilitate hardware replacement and upgrade, the control chip 51 and the radio frequency module 21 do not need to be mounted on the same circuit board 10. In addition, considering that the thermoelectric cooler 40 is used to dissipate heat for the control chip 51 and the shield 30 is used to prevent condensation, the control chip 51 and the radio frequency module 21 do not need to be mounted on the same circuit board 10.

It should be noted that the foregoing are merely preferred embodiments and technical principles of this application. A person skilled in the art may understand that this application is not limited to specific embodiments described herein, and a person skilled in the art may make various obvious changes, readjustments, and replacements without departing from the protection scope of this application. Therefore, although this application is described in detail by using the foregoing embodiments, this application is not limited to the foregoing embodiments, and may further include more other equivalent embodiments without departing from the concept of this application, which all fall within the protection scope of this application.

What is claimed is:

1. A controller, comprising:
   a first circuit board, wherein a first connector is disposed on the first circuit board;

a radio frequency module, disposed on the first circuit board;

a control chip, disposed on the first circuit board; and a second circuit board, wherein a second connector is disposed on the second circuit board, wherein the first circuit board is detachably mounted to the second circuit board through a connection between the first connector and the second connector, and wherein the controller further comprises:

a thermoelectric cooler disposed on the first circuit board to dissipate heat for the control chip;

a shield that shields the control chip and the thermoelectric cooler; and a connection line disposed on the thermoelectric cooler and configured to pass out of the shield through a through hole of the shield.

2. The controller according to claim 1, wherein the second connector comprises a locking mechanism, and the locking mechanism is configured to lock the first circuit board to the second connector.

3. The controller according to claim 2, wherein the locking mechanism comprises a screw.

4. The controller according to claim 1, wherein an Ethernet cable connector is disposed on the second circuit board.

5. The controller according to claim 1, wherein the control chip and the thermoelectric cooler are sealed in a space formed by the shield and the first circuit board.

6. The controller according to claim 5, further comprising a sealing ring, wherein the sealing ring is disposed between the shield and the first circuit board.

7. The controller according to claim 5, further comprising a glue filling portion filled in the space.

8. The controller according to claim 1, wherein the shield is a metal part; and the thermoelectric cooler has a hot end, and the hot end contacts an inner surface of the shield.

9. The controller according to claim 1, wherein the radio frequency module and the control chip are disposed on one surface of the first circuit board.

10. A vehicle, comprising a controller, wherein the controller comprises:

a first circuit board, wherein a first connector is disposed on the first circuit board;

a radio frequency module, disposed on the first circuit board;

a control chip, disposed on the first circuit board; and a second circuit board, wherein a second connector is disposed on the second circuit board, wherein the first circuit board is detachably mounted to the second circuit board through a connection between the first connector and the second connector, and wherein the controller further comprises:

a thermoelectric cooler disposed on the first circuit board to dissipate heat for the control chip;

a shield that shields the control chip and the thermoelectric cooler; and a connection line disposed on the thermoelectric cooler and configured to pass out of the shield through a through hole of the shield.

11. A control method for a controller, wherein:

the controller comprises:

a first circuit board, wherein a first connector is disposed on the first circuit board;

a radio frequency module, disposed on the first circuit board;

a control chip, disposed on the first circuit board;

a second circuit board, wherein a second connector is disposed on the second circuit board, wherein the first circuit board is detachably mounted to the second circuit board through a connection between the first connector and the second connector;

a thermoelectric cooler, disposed on the first circuit board and configured to dissipate heat for the control chip;

a shield that shields the control chip and the thermoelectric cooler; and a connection line disposed on the thermoelectric cooler and configured to pass out of the shield through a through hole of the shield; and the control method comprises:

obtaining a temperature of the control chip; and when the temperature is lower than a first threshold, configuring the thermoelectric cooler to stop working.

12. The control method according to claim 11, further comprising:

when the temperature exceeds a second threshold, configuring the thermoelectric cooler to be in a heat dissipation mode, wherein the second threshold is higher than the first threshold.

13. The control method according to claim 11, further comprising:

when the temperature is lower than a third threshold, configuring the thermoelectric cooler to be in a heating mode, wherein the third threshold is lower than the first threshold.

14. The control method according to claim 11, wherein the second connector comprises a locking mechanism, and the locking mechanism is configured to lock the first circuit board to the second connector.

15. The control method according to claim 14, wherein the locking mechanism comprises a screw.

16. The control method according to claim 11, wherein an Ethernet cable connector is disposed on the second circuit board.

* * * * *